United States Patent [19]
Hornung et al.

[11] Patent Number: 5,905,869
[45] Date of Patent: May 18, 1999

[54] TIME OF CENTURY COUNTER SYNCHRONIZATION USING A SCI INTERCONNECT

[75] Inventors: Bryan D. Hornung, Plano; Tony M. Brewer, Richardson, both of Tex.

[73] Assignee: Hewlett-Packard, Co., Palo Alto, Calif.

[21] Appl. No.: 08/720,332

[22] Filed: Sep. 27, 1996

[51] Int. Cl.⁶ ............................................. G06F 17/00
[52] U.S. Cl. ................................ 395/200.58; 395/557
[58] Field of Search ...................... 375/356; 395/200.58, 395/551, 553, 557, 558; 340/825.14

[56] References Cited

U.S. PATENT DOCUMENTS

| | | | |
|---|---|---|---|
| 4,596,025 | 6/1986 | Satoh | 375/356 |
| 4,630,291 | 12/1986 | Lankar et al. | 375/356 |
| 4,677,614 | 6/1987 | Circo | 370/222 |
| 4,746,920 | 5/1988 | Nellen et al. | 340/825.14 |
| 4,815,110 | 3/1989 | Benson et al. | 375/356 |
| 4,939,753 | 7/1990 | Olson | 375/356 |
| 5,164,619 | 11/1992 | Luebs | 327/297 |
| 5,361,277 | 11/1994 | Grover | 375/356 |
| 5,416,808 | 5/1995 | Witsaman et al. | 375/356 |
| 5,560,027 | 9/1996 | Watson et al. | 395/800.12 |

OTHER PUBLICATIONS

IEEE Standard for Scalable Coherent Interface (SCI), IEEE Std. 1596–1992 ISBN 1–55937–222–2; pp. 49–80, see specifically Section 3.4.6 "Global Time Synchronization".

*Primary Examiner*—Ellis D. Ramirez

[57] ABSTRACT

A multi-processor multi-node system having access to a low skew clock to synchronize processing events. This system uses a SCI network to distribute a low skew signal to synchronize the time of century clock counters on the different nodes. These counters are periodically synchronized with a signal from a selected master counter, so that all nodes will maintain approximately equal counter values. A single bit in a SCI header of send, echo, or idle packet is routed to all nodes via a SCI ring. Since the bit is inserted in existing packets, the creation of a special synchronizing packet is not required. Moreover, since the bit travels over existing lines, additional signal paths or extra wire are not needed.

32 Claims, 5 Drawing Sheets

FIG. 6

| flag bit | | | | | | | | | | | | | | |
|---|---|---|---|---|---|---|---|---|---|---|---|---|---|---|
| 0 | previous CRC or idle 41 | | | | | | | | | | | | | |
| 1 | init | destID | sync | srcID | | TID | dl | ds | echo | busy | resp | clk | old | phase |
| | 1 | 7 | 1 | 7 | 2 | 5 | 1 | 1 | 1 | 1 | 1 | 1 | 1 | 2 |
| 1 | command | op | | P | | bytemask | | | T | | addr<0:3> | | | |
| | 6 | 3 | 2 | 1 | 3 | 11 | | | 2 | | 4 | | | |
| 1 | addr<4:35> |
| 1 | data |
| 1 | data |
| 1 | data |
| 1 | data |
| 1 | data |
| 1 | data |
| 1 | data |
| 1 | data |
| 0 | low CRC | high CRC |

FIG. 7

| 0 | Definition | 59 | 42 61 | 43 62 | 44 63 |
|---|---|---|---|---|---|
| | reserved | | Source | X ring | Y ring |

| Read Value | | | | |
|---|---|---|---|---|
| zeros | | last write | last write | last write |

| Write Value | | | | |
|---|---|---|---|---|
| ignored | | stored | stored | stored |

TIME OF CENTURY COUNTER SYNCHRONIZATION USING A SCI INTERCONNECT

RELATED APPLICATIONS

This application is related to the following copending commonly-assigned U.S. patent applications: METHOD AND SYSTEM FOR MAINTAINING STRONG ORDERING IN A COHERENT MEMORY SYSTEM Ser. No. 08/720,330; ERROR CONTAINMENT CLUSTER OF NODES Ser. No. 08/720,368; and ROUTING METHODS FOR A MULTINODE SCI COMPUTER SYSTEM Ser. No. 08/720,331; all filed concurrently with this application on Sep. 27, 1996, and hereby incorporated by reference herein.

TECHNICAL FIELD OF THE INVENTION

This invention relates generally to multi-processor systems, and specifically, to a method and system for synchronization of a multi-processor system.

BACKGROUND OF THE INVENTION

In order to synchronize a multi-node, multi-processor system, each processor clock in the system must be relatively synchronized with the other processor clocks. To accomplish this, the approximate time must be known at certain processing points, and the time needs to be approximately the same throughout the system.

In the system, each node has a clock counter and each processor on that node reads that clock counter. Unfortunately, each counter clock, and hence each node, in the system runs at a slightly different clock frequency. The difference in clock frequencies is because the crystals in each counter are not exactly identical. The different crystal frequencies allow the counters to drift apart in their time values. The physical differences in the crystals cannot be controlled.

The known prior art solves this drifting problem by using extra wires connected between each node. These wires provide separate signal paths for conveying synchronizing signals. After a time interval, which is defined by the hardware, a synchronization packet is distributed via the wire, and each node then receives that signal and changes its counter time appropriately.

The problem with the prior art solution is that it is expensive in terms of the costs to performance because of the extra signal paths. The prior art solution also added complexity to the system because the wires require additional connections which can introduce more problems and errors in the circuit, particularly with respect to grounding between the connections.

Therefore, there is a need in the art for a system and method for providing access to low skew clocks on different nodes that are synchronized with each other.

There is also a need in the art for a system and method to synchronize the clocks on the different nodes without introducing latencies during synchronization.

There is also a need in the art for a system and method to synchronize the clocks on the different nodes without reducing system performance.

SUMMARY OF THE INVENTION

The above and other needs are met by a system and method that provide multi-processor systems access to a low skew clock to synchronize processing events. This invention uses existing hardware, such as an SCI or scalable coherent interconnect network, to distribute a low skew signal to synchronize the time of century clocks on the different nodes. By periodically synchronizing these counters with a signal from a selected master counter, all nodes will maintain approximately equal counter values. A single bit in the SCI header of send, echo, and idle packets is routed to all nodes via a SCI ring. Since the bit is inserted in existing packets, or routine packets, the creation of a special synchronizing packet is not required. Moreover, since the bit travels over existing lines, additional signal paths or extra wire are not needed.

A technical advantage of the present invention is to use the SCI to send a synchronization ("sync") pulse to all of the clocks on the system.

Another technical advantage of the present invention is to use an existing data packet to carry the sync pulse.

A further technical advantage of the present invention is to place the sync pulse in the header of the existing data packet.

The foregoing has outlined rather broadly the features and technical advantages of the present invention in order that the detailed description of the invention that follows may be better understood. Additional features and advantages of the invention will be described hereinafter which forms the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 6 depicts the layout of a typical SCI data packet; and

FIG. 7 depicts the TAC TOC control and status register.

DESCRIPTION OF THE PREFERRED EMBODIMENTS

Figure 1:
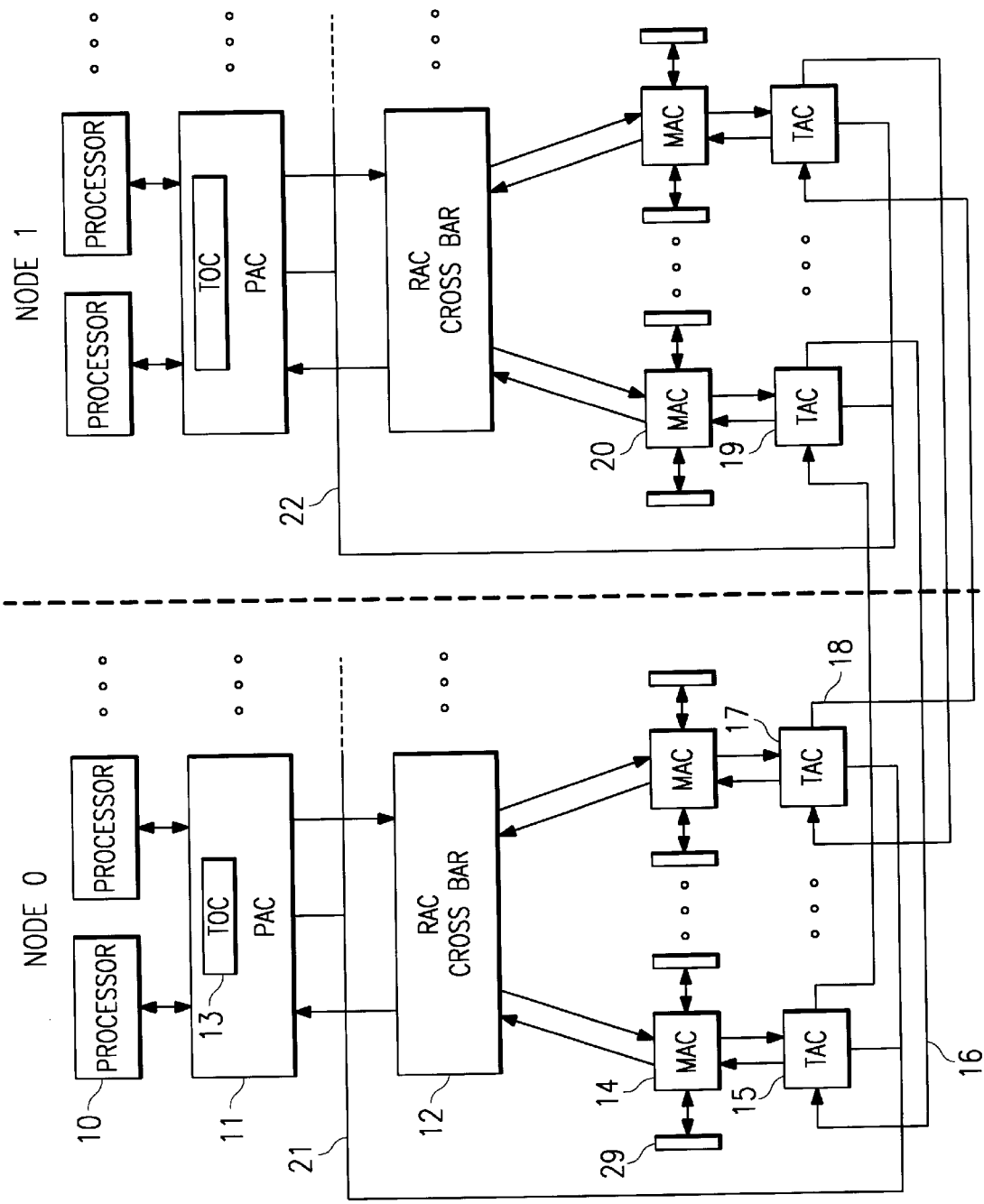
FIG. 1 is a schematic diagram of the multi-node, multi-processor system using a SCI network with the inventive synchronization arrangement.
Figure 2:
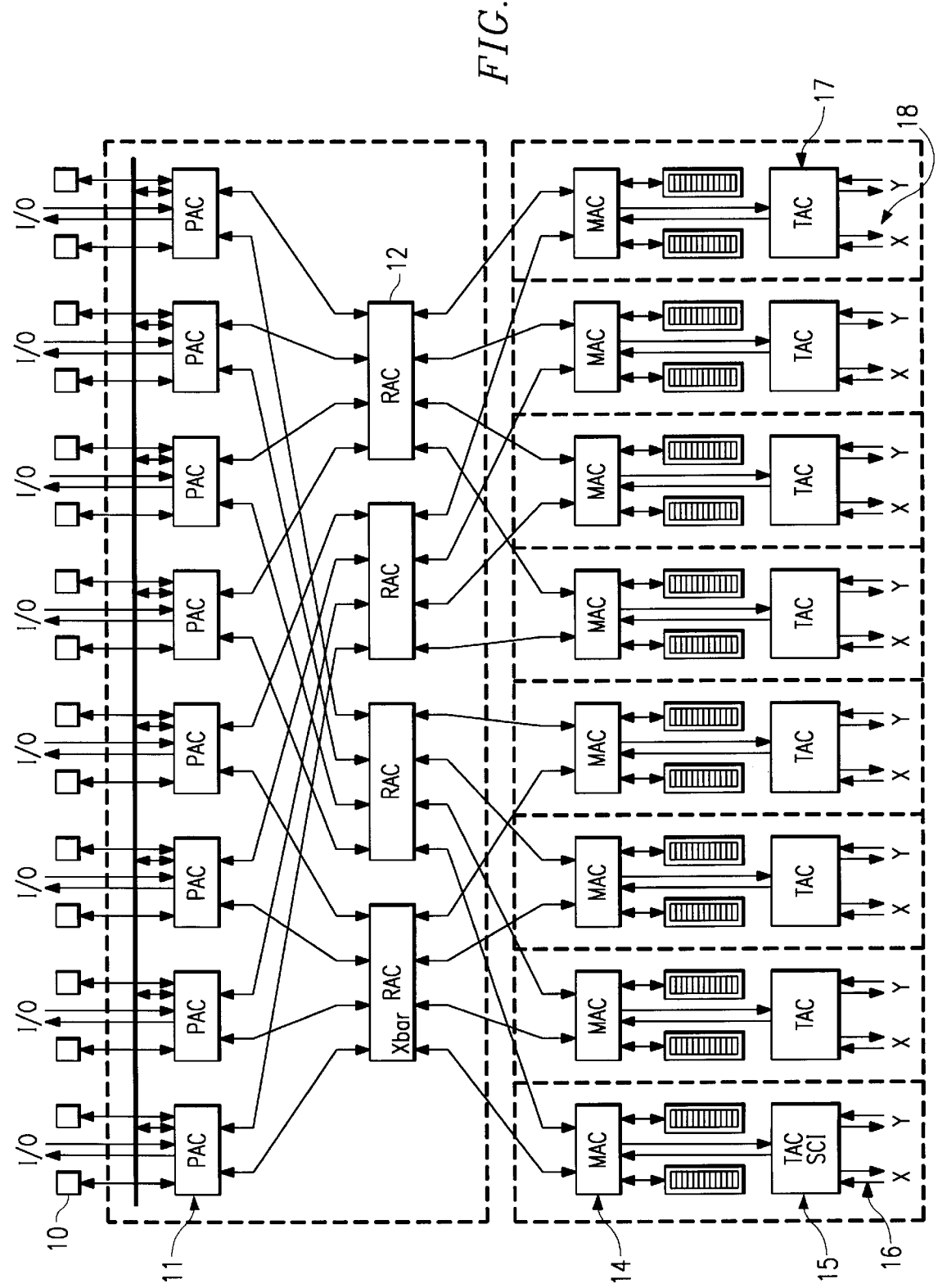
FIG. 2 is a more detailed schematic diagram of the system of FIG. 1 showing a single node.

FIG. 1, depicts a schematic overview of two nodes of a total of 112 possible nodes in the system, specifically nodes 0 and 1. FIG. 2 depicts the element arrangement of a single node. The different nodes may be partitioned into clusters to improve system survivability, which is discussed in the co-pending application entitled "ERROR CONTAINMENT CLUSTER OF NODES" filed on Sep. 27, 1996, Ser. No. 08/720,368 which is incorporated herein by reference.

Figure 3:
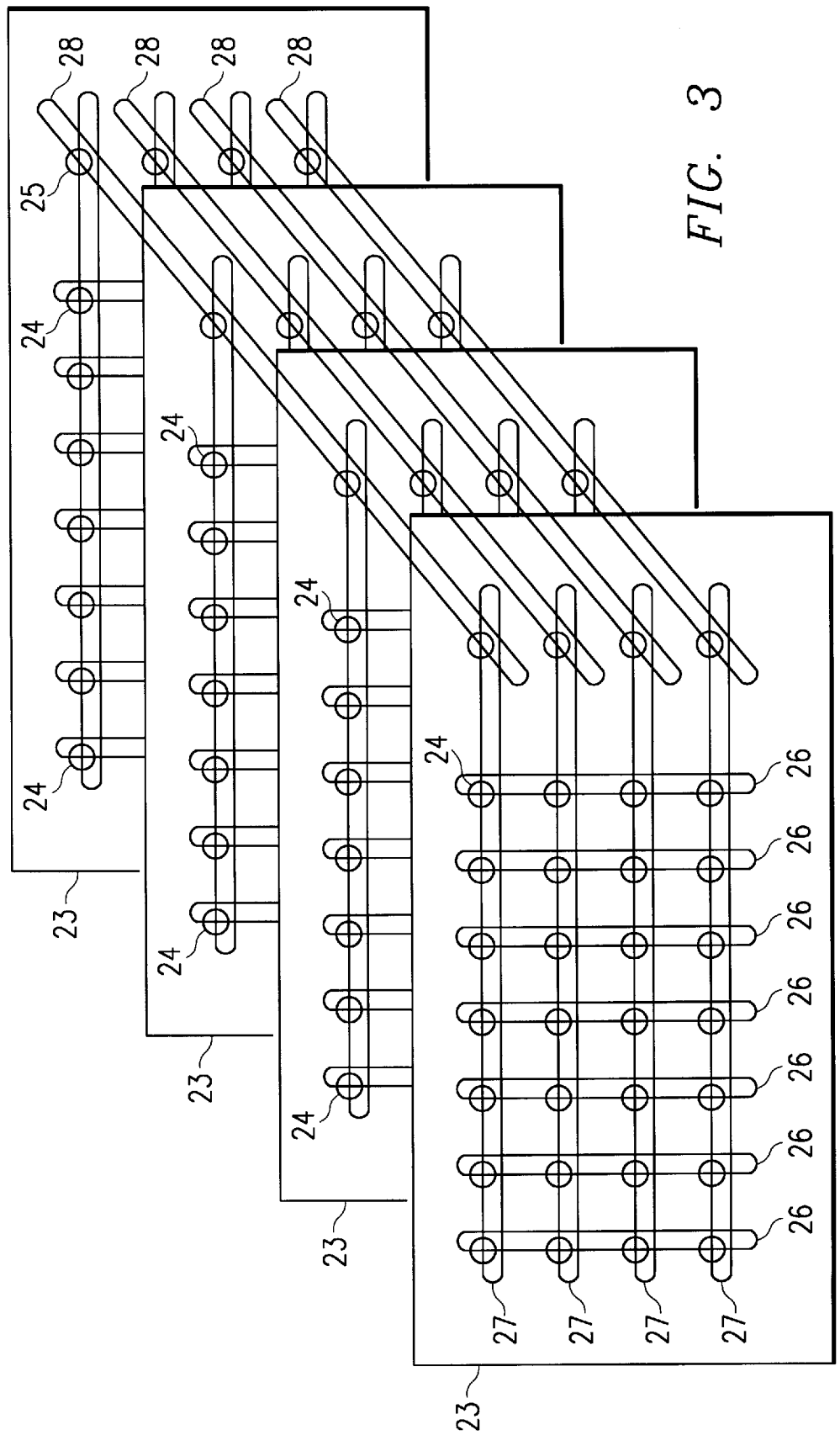
FIG. 3 is a schematic diagram of a 112 node system.

The multiprocessor computer system may have two nodes, or it may have as many as 112 nodes. As shown in FIG. 3, in the 112 node system, the nodes 24 are organized as seven X-dimension rings 26 by four Y-dimension rings 27 forming a wall 23. Four of such walls are interconnected by four Z-dimension rings 28. A bridge node is used to connect a Y-dimension ring to a Z-dimension ring.

Up to two processors 10 may be connected to the processor agent 11, labeled PAC for processor agent chip. A single node may have up to eight PACs 11. Note that there are a large number of identical elements. For purposes of clarity, this discussion will refer to like elements with a single reference numeral. When distinction is made between two or more like elements, the distinct element will be given a new reference number.

The processor 10 is preferably a HEWTLETT-PACKARD PA-8000 processor. However, the present invention is not limited by processor type or architecture. The processors 10 are attached through a runway bus to the PAC 11. PAC 11 has an input/output (I/O) subsystem and is coupled to cross bar 12 and the core logic access bus. The core logic access bus is used primarily for system boot operations. The bus is a low bandwidth multi-drop bus which interfaces all PACs to erasable programmable read-only memory (EPROM), synchronous dynamic random access memory (SDRAM), a real time clock, and RS-232 and Ethernet interfaces. Additionally, a processor can write to control and status registers (CSRs) which are accessed using the bus to initialize and configure the cross bar.

The function of the PAC 11 is to transmit requests from the processors 10 through the cross bar 12 and to the memory access system 14 and then forward the responses back to the requesting processor 10. Inside each PAC 11 is a time of century counter 13 labelled TOC. Since each PAC handles two processors and there are up to 8 PACs in a node, each node may have up to 16 processors. FIG. 2 depicts four cross bars 12, however, each PAC communicates with two of the cross bars.

The PACs communicate with memory controllers 14 through cross bar 12 using four unidirectional data paths. The cross bars 12, labeled RAC for routing attachment chip, are routers that receive a packet from any of the agents 11 and then route it to any of the memory access controllers 14 labelled MAC. Each PAC has 16 32-bit wide unidirectional interconnects coupling each RAC to four PACs and four MACs. The cross bar does not have any CSRs of its own, but rather is initialized by writes to CSRs which reside on the core access logic bus. These CSRs control which ports are active as well as enabling error detection.

The MAC 14 controls access to coherent memory. The memory access controllers can number from 2 to 8, in multiples of 2, and each MAC supports up to 2 Gbytes in 4 banks, each bank 29 with 512 Mbytes. Thus, each node can access up to 16 Gbytes, and a 28 node system can access 448 Gbytes. The memory banks comprise SIMMs of synchronous DRAMs or SDRAMs. FIG. 2 depicts only 2 memory banks 29 for simplicity. The memory is used for node local memory, network caching, and messaging. A method for maintaining cache coherency is discussed in the co-pending application entitled "METHOD AND SYSTEM FOR MAINTAINING STRONG ORDERING IN A COHERENT MEMORY SYSTEM" filed on Sep. 27, 1996 Ser. No. 08/720,330, which is incorporated herein by reference.

When the processor 10 generates a request to access memory or other resource, PAC 11 will examine the request address to determine the proper MAC for handling the request, and then PAC 11 sends the request through the RAC 12 to the appropriate MAC 14. If the MAC 14 determines the node ID is not to a local memory address, then MAC 14 forwards the request to the ring interface controller 15, which is labelled TAC (also known as "toroidal access chip"). If the MAC 14 determines the request address on the local node, the MAC accesses the attached memory 29.

The TAC acts as an interface from the node to a SCI ring. The TAC communicates with the MAC using two unidirectional data paths. Each TAC interfaces to two SCI rings, an X-dimension ring and a Y-dimension ring. FIG. 1 only shows a single dimension for simplicity. FIG. 1 also shows one TAC 15 interfacing ring 16 and another TAC 17 interfacing ring 18.

TAC 15 is capable of operating a separate ring 16, and since there can be up to 8 MAC/TAC pairs, there can be a total of up to 8 SCI rings connecting sections of nodes in a single dimension, i.e. 8 X-dimension rings and 8 Y-dimension rings. The SCI interface rings are defined in the IEEE Standard for Scalable Coherent Interface (SCI), IEEE Std. 1596-1992 ISBN 1-55937-222-2, which is incorporated herein by reference. The TAC 15 receives non-local memory access requests from the MAC 14 and places the request into the SCI ring 16. In FIG. 1, the receiving TAG 19 receives the request from the sending TAG 18 and then forwards the request to its local MAC 20. If the memory access satisfies the request, then the response would retrace the path through TAG 19, ring 16, TAC 15, MAC 14, RAC 12, PAC 11, to processor 10.

Inside each PAC processor agent there is a logic arrangement that is called TOC 13 or the time of century counter. This counter counts according to the local clock frequency, and each processor attached to the PAC has access to this counter with relatively equal latency between the processors such that if the two different processors read the TOC at substantially the same time, each processor would be set to approximately the same value, or at least within an acceptable tolerance limit. Each node has a single crystal clock and the TOCs on the same node operate from that clock.

Problems occur in that each node has a different crystal so the time and century counter operating on the different nodes are running at slightly different frequencies. The TOC counting needs to be synchronized periodically, such that when a remote processor on a different node reads or accesses the memory or other device on the local node, each processor (local and remote) when reading its own TOC, read approximately the same value.

In each node there are 8 PACs, each PAC with its own time of century counter or TOC. A wire 21 connects all 8 of these PACs in the node. Periodically, a sync pulse is sent down the wire 21 causing each PAC to synchronize its TOC. Since all the TOCs on the same node are running on the same crystal, there is no drift between the TOCs on the same node.

The wire 21 that connects all PACs in the node is also connected to all TACs in the node. One of the TACs in one of the nodes is selected as the TOC master. The task of the TOC master is to send the sync pulse around the SCI ring to all of the nodes connected to that SCI ring. Since the sync pulse is inserted into either an idle symbol or a header symbol of an existing data packet, the sync pulse can get to the other nodes faster than by creating a data packet for the sole purpose of transmitting the sync pulse. Moreover, since the sync pulse is in the header of the packet, the sync pulse is acted on before the remainder of the data in the packet. Therefore, when a processor reads the TOC on another node, there is no perceived drift between the different TOCs because the TOC sync signal is faster than any other packet.

Figure 4:
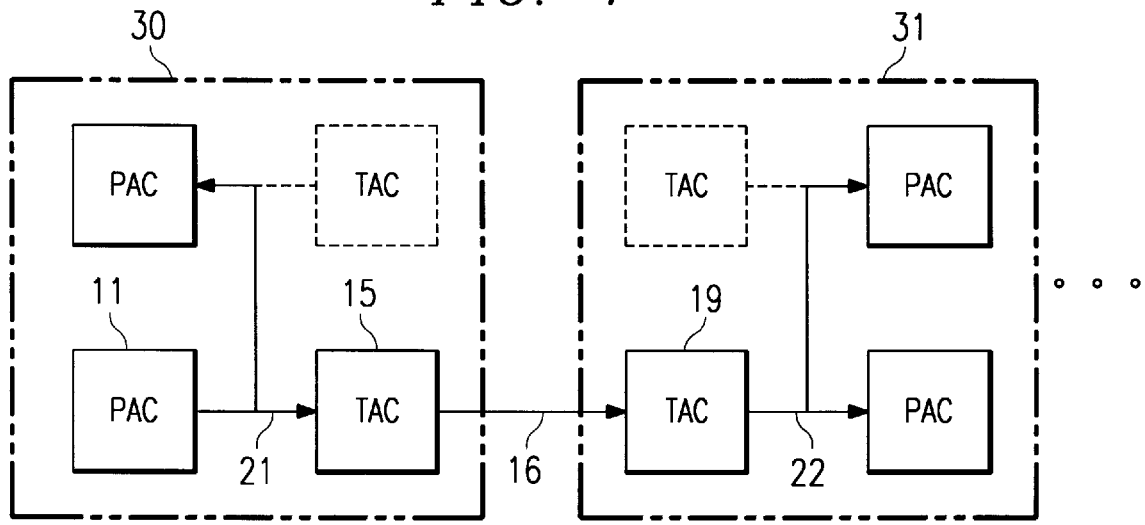
FIG. 4 is a schematic diagram showing the sync pulse distribution arrangement.

As shown in FIG. 4, a single node 30, usually node 0, is designated to be the master, and this master node generates the TOC sync signal, which is sent to the remaining nodes or slave nodes 31. One of the PACs on the master node is designated to be the master PAC 11, this master PAC 11 generates the TOC sync signal and sends the signal to the other non-master PACs on the master node 30. Simultaneously, the TOC sync signal is transferred onto the SCI ring 16 via the TAC 15 and then transferred to the slave nodes 31. On the slaves nodes, the TAC 19 receives the TOC sync signal and then sends that pulse on the wire 22 which is connected to all PACs on that node 31. Therefore, all of the PACs on the slave nodes will receive the TOC sync signal at approximately the same time.

The sync wire 21 connects all PACs and all TACs so that the TOC sync signal actually is transmitted to all 8 TACs in the master node. Only one TAC is actually used to transmit the sync signal to other slave nodes, but software can select which TAC is used, and therefore, if a hardware failure occurs, a backup TAC can be selected that uses a different ring and thus operations can continue without having to stop to fix the failure.

Figure 5:
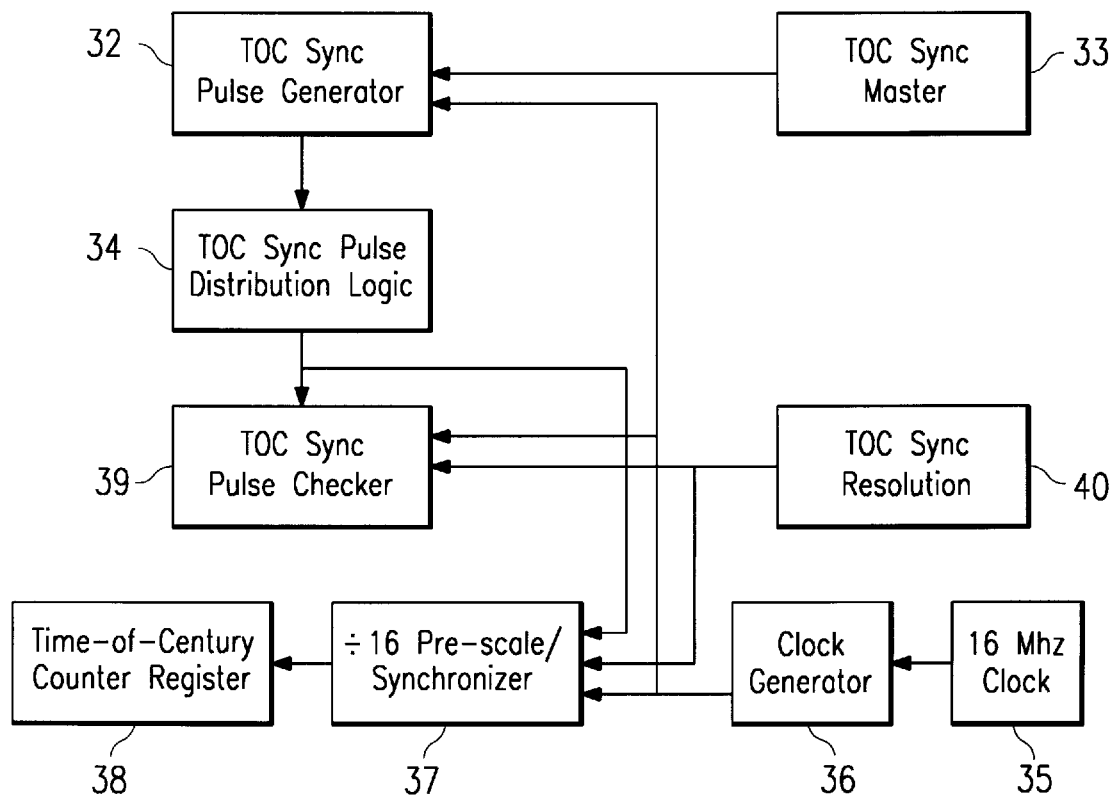
FIG. 5 is a block diagram of the time of century clock hardware.

FIG. 5 depicts the hardware for the TOC. The TOC provides a mechanism for very low latency access to a system wide synchronized clock. The TOC can be used to generate time stamped trace data for later analysis. The time-stamped trace data from each node can be merged in a post processing step to provide an accurate global picture, with event sequences in the 5–10 microsecond range. The TOC also provides time stamp of transmitted messages. The receiver can determine the transmission time by subtracting the time stamp from the current time.

Each PAC in the system has a TOC sync pulse generator 32, even though the generator is only used in the master PAC on the master node. The master TOC sync generator is activated by the TOC sync master selector 33. The selectors in all remaining PACs deselects, or sets to off, their respective generators. Therefore, only one PAC will be generating a pulse and will distribute it to all other PACs in the system. The generator 32 sends the signal to the distribution logic 34, which includes the wire 21. The TOC sync signal goes to all local PACs, but also goes to all local TACs. One of the TACS, the master TAC, is selected to send that signal to all remote PACs via the SCI ring. The receiving TAC 19 receives the TOC sync pulse and distributes it to all 8 PACs on its node. Now as each PAC receives the pulse, the PAC uses it to resynchronize its TOC.

The crystal clock 35 and clock generator 36 on each node generates a 16 Mhz clock for the TOCs on each PAC. The PAC synchronizes the crystal clock to its own TOC every 7 or 8 TOC clocks. The master PAC generates a TOC sync pulse every 256 clocks or 16 μsec.

In general, the 16 Mhz clock 35 is scaled down by the pre-scale/synchronizer 37 and becomes the time of century counter register 38. This is the register that is read by the local processors located on this particular PAC. The checker logic 39 ensures that the TOC counter registers maintain synchronization within their specified resolution. The logic 34 checks to ensure the time between synchronization pulses is in the range of the synchronization period plus or minus one half the synchronization resolution. The resolution is set by the TOC sync resolution logic 40. Table I below shows the check range for some of the supported resolution.

TABLE I

| Resolution | Check Range (16 μsec) |
|---|---|
| 1 μsec | 256 ± 7 |
| 2 μsec | 256 ± 15 |
| 4 μsec | 256 ± 31 |

If the checker logic detects a pulse that is early or late, an interrupt is sent to one of the processors connected to this PAC.

The pre-scale logic 37 performs a divide by 16 on the clock 35 resulting in a 1 μsec period signal. This signal is used to enable incrementing of the TOC counter register 38. Synchronization of the register 38 is performed by rounding up or down the pre-scale value when a sync pulse arrives. The amount of rounding is a function of the TOC resolution 40.

SCI is a packet based protocol. Each packet essentially comprises a header and then 0–8 data symbols depending on the type of packet. The header has an additional bit which is labelled CLK. This bit is the TOC sync bit. FIG. 6 depicts a typical SCI packet with the CLK bit 41 in the header. When a PAC receives a TOC sync from its master PAC it will then locate the first available header that it can modify, and then set the CLK bit. As every other TAC on the ring receives this packet with the CLK bit, it will take the bit and forward the bit to its local PACs, and also forward that bit down the ring to the next TAC. Finally, the CLK bit is passed around the ring all the way back to the original, or master TAC, and the master TAC will take the bit out of the header and not forward it to its local PACs, nor will it pass the bit to the next TAC.

The CLK is not used in calculating the cycle redundancy code or CRC code that is included in each packet. This allows the CLK bit to be changed on the fly without having to recalculate the CRC. The CRC is defined in the SCI specification. The CRC is essentially a huge XOR of all bits in the packet, that has been saved in the last packet, and as the packet is received on each TAC, a new CRC is calculated and compared to the transmitted one. If the two CRCs differ, then an error has occurred. The CLK bit is added to any header. Therefore, very little latency occurs because, at most, the TAC has to wait for the current packet to finish before it finds the header of the next packet. Thus, a new packet does not have to be created and no packets are added to the ring for this bit.

Each TAC has a control status register CSR which governs how the sync pulse is propagated throughout the system. The CSR specifies the source for the incoming sync pulse. The CSR also specifies whether the sync pulse will be propagated to the SCI X-dimension ring or the Y-dimension ring.

As shown in FIG. 7, the TAC TOC configuration register has three fields. The source field 42 is a two-bit field that specifies which synchronization pulse input (sync signal, X-incoming link or Y-incoming link) should be propagated to the enabled synchronization pulse output. The two bits allow four choices, which are value 0: no solution or do nothing; value 1: take the signal from the PAC and distribute it; value 2: take the signal from the X input in the two dimensional ring structure and distribute it; and value 3: take the signal from the Y input and distribute it. The last two fields, 43 and 44, dictate how the bit is distributed. If there is one in the X-ring or the Y-ring bits, then the TOC sync signal will be disbursed on the first available header on that ring. The x-y layout is discussed in the co-pending application entitled "ROUTING METHODS FOR A MULTINODE SCI COMPUTER SYSTEM" filed on Sep. 27, 1996, Ser. No. 08/720,331, which is incorporated herein by reference.

Although the present invention and its advantages have been described in detail, it should be understood that various changes, substitutions and alterations can be made herein without departing from the spirit and scope of the invention as defined by the appended claims.

What is claimed is:

1. A multiprocessor computer system having low skew time counters for synchronized processing events, the computer system comprising a plurality of nodes interconnected by a plurality of SCI rings, each node comprising:

a time counter that generates a time value;

a SCI controller that interfaces the node with a SCI ring; and a synchronization signal distribution path that conveys a synchronization signal between the SCI controller and the time counter;

wherein one of the plurality of nodes is designated to be a master node, and the master node includes means for generating the synchronization signal, the signal is distributed to the remaining nodes of the system via the distribution path and SCI rings, and the signal changes the time value of each time counter in the system.

2. The computer system according to claim 1, wherein: the time counter is a time of century counter.

3. The computer system according to claim 1, wherein the means for generating the synchronization signal further comprises:

a pulse synchronization generator that generates the signal, the signal is distributed to the time counter and the SCI controller on the master node through the distribution path;

wherein the SCI controller receives the signal and locates an available data packet, the SCI controller sets a time counter synchronization bit in the data packet, and the data packet with the set bit is distributed to the remaining nodes of the system via the SCI rings.

4. The computer system according to claim 3, wherein: the time counter synchronization bit is in a header of the data packet.

5. The computer system according to claim 4, wherein the data packet is selected from the group consisting of:

a send packet, an echo packet, and an idle packet.

6. The computer system according to claim 1, wherein each node further comprises:

a clock that generates a clock frequency;

wherein the time counter uses the clock frequency to generate the time value.

7. The computer system according to claim 6, wherein the frequency of the clock is 16 Mhz; and the means for generating the synchronization signal periodically generates the signal based upon the clock frequency.

8. The computer system according to claim 1, wherein each node further comprises:

at least one processor for processing data;

a memory for storing data;

at least one processor agent for dispatching a request to transact with a target memory from the processor, and routing a response back to the processor, the at least one processor agent includes the time counter;

at least one memory agent for controlling access to the memory, that receives the request from the processor agent and determines a location of the target memory; and at least one crossbar for routing the request and response between the processor agent and the memory agent;

wherein when the memory agent determines the target memory is the memory, then the memory agent accesses the memory and responds to the processor; and when the memory agent determines the target memory is located on a remote node, then the memory agent forwards the request to the SCI controller, the SCI controller sends the request to the remote node through the SCI ring.

9. The computer system according to claim 8, wherein the means for generating the synchronization signal further comprises:

a pulse synchronization generator that generates the signal, the signal is distributed to the processor agent and the SCI controller on the master node through the distribution path;

wherein the SCI controller receives the signal and locates an available data packet, the SCI controller sets a time counter synchronization bit in the data packet, and the data packet with the set bit is distributed to the remaining nodes of the system via the SCI rings.

10. The computer system according to claim 9, wherein: the time counter synchronization bit is in a header of the data packet.

11. The computer system according to claim 9, wherein the data packet is selected from the group consisting of:

a send packet, an echo packet, and an idle packet.

12. The computer system according to claim 8, wherein each node includes a means for generating the synchronization signal, each node further comprising:

a master selector means for enabling only the means for generating the synchronization signal on the master node and disabling the means for generating the synchronization signal on the remaining nodes.

13. The computer system according to claim 8, wherein:

each node comprises eight processor agents with eight time counters;

each node comprises sixteen processors;

each node comprises eight SCI controllers; and and each processor agent is coupled to two processors.

14. The computer system according to claim 13, wherein:

one of the processor agents in the master node is designated the master processor agent;

one of the SCI controllers in the master node is designated the master SCI controller;

the means for generating the synchronization signal resides in the master processing agent;

the synchronization signal distribution path conveys the synchronization signal between all SCI controllers and all time counters on each node;

the master processing agent distributes the signal to the remaining processing agents in the master node via the distribution path, and the signal changes the time value of each time counter in the master node;

the master SCI controller distributed the signal to the remaining nodes of the system via the SCI rings; and the SCI controllers of the remaining nodes receive the signal and distribute the signal to the processing agents in the remaining nodes via the distribution paths in each of the remaining nodes, and the signal changes the time value of each time counter in each of the remaining nodes.

15. The computer system according to claim 1, wherein:

the plurality of nodes are arranged as a two dimensional array with at least one respective SCI ring connecting each node in a respective row of the array, and at least one respective SCI ring connecting each node in a respective column of the array.

16. The computer system according to claim 15, wherein:

each node comprises eight SCI controllers, such that the array has eight SCI rings connecting the nodes in each of the rows, and eight SCI rings connecting the nodes in each of the columns.

17. A multiprocessor computer system in combination with a SCI data packet; the computer system comprises a plurality of nodes including a master node, that are interconnected by a plurality of SCI rings; the master node comprises a time counter that generates a time value, a SCI controller that interfaces the node with a SCI ring, and synchronization signal distribution path that conveys a synchronization signal between the SCI controller and the time counter; the data packet comprising:

a header that includes a time counter synchronization bit and data symbols;

wherein the master node includes means for generating synchronization signal that periodically sets the time counter synchronization bit in the data packet, and the data packet with the set bit serves as the synchronization signal that is distributed to the remaining nodes of the system via the distribution wire and SCI rings, and the signal changes the time value of each time counter in the system.

18. The combination multiprocessor computer system and SCI data packet according to claim 17, wherein the data packet is selected from the group consisting of:

a send packet, an echo packet, and an idle packet.

19. The combination multiprocessor computer system and SCI data packet according to claim 17, wherein:

the time counter is a time of century counter.

20. A method for optimizing the performance of clock resources in a computer system, comprising the steps of:

(a) establishing a data pathway between a master time counter and each of at least one remote time counter, each remote time counter desired to be in a; predefined temporal relationship with the master time counter.

(b) sending a data packet from the master time counter to first selected ones of the remote time counters via the data pathway, the data packet indicative of a timing event; and (c) using the data pathway to transmit other data concurrently with the data packet, the other data also not indicative of a timing event: wherein the data packet includes a header, with information in the header being indicative of the timing event.

21. The method of claim 20, in which the data pathway is a scalable coherent interface network.

22. The method of claim 20, in which the temporal relationship is synchronicity.

23. The method of claim 20, in which the timing event is a synchronization pulse.

24. The method of claim 20, in which the master time counter is a time of century counter.

25. The method of claim 20, in which the remote time counters are time of century counters.

26. The method of claim 20, in which the master time counter is on a master node, and second selected ones of the remote time counters are on other nodes.

27. The method of claim 20, in which the data packet is selected from a group consisting of a send packet, an echo packet, and an idle packet.

28. A method for optimizing the performance of clock resources in a multi-node computer system, comprising the steps of:

(a) establishing a data pathway between a master time counter and each of at least one remote time counter, each remote time counter desired to be in synchronicity with the master time counter, first selected ones of the at least one remote time counter being located on different nodes from the master time counter;

(b) including a synchronization pulses in the header of a data packet, the data packet further including information not indicative of a timing event;

(d) sending the data packet from the master time counter to second selected ones of at least one remote time counter via the data pathway; and p1 (d) using the data pathway to transmit other data concurrently with the data packet, the other data also not indicative of a timing event; wherein the data packet includes a header, with information in the header being indicative of the timing event.

29. The method of claim 28, in which the data pathway is a scalable coherent interface network.

30. The method of claim 28, in which the master time counter is a time of century counter.

31. The method of claim 28, in which the remote time counters are time of century counters.

32. The method of claim 28, in which the data packet is selected from a group consisting of a send packet, an echo packet, and an idle packet.

* * * * *

UNITED STATES PATENT AND TRADEMARK OFFICE
CERTIFICATE OF CORRECTION

PATENT NO.   : 5,905,869
DATED        : May 18, 1999
INVENTOR(S)  : Bryan D. Hornung et al.

It is certified that error appears in the above-identified patent and that said Letters Patent is hereby corrected as shown below:

Column 3,
Line 14, delete "HEWTLETT" and insert therefor -- HEWLETT --

Column 4,
Line 22, delete "TAG 19" and insert therefor -- TAC 19 --
Line 23, delete "TAG 18" and insert therefor -- TAC 18 --
Line 26, delete "TAG 19" and insert therefor -- TAC 19 --

Column 10,
Line 35, delete "(d)" and insert therefor -- (c) --
Line 37, after "and", "p1" should be deleted and "(d)" should begin a new paragraph Signed and Sealed this Twenty-fourth Day of September, 2002

Attest:

JAMES E. ROGAN
Attesting Officer   Director of the United States Patent and Trademark Office